US012693557B2

(12) United States Patent
Okahashi et al.

(10) Patent No.: US 12,693,557 B2
(45) Date of Patent: Jul. 28, 2026

(54) OPTICAL WAVEGUIDE DEVICE, AND OPTICAL MODULATION DEVICE AND OPTICAL TRANSMISSION APPARATUS USING SAME

(71) Applicant: SUMITOMO OSAKA CEMENT CO., LTD., Tokyo (JP)

(72) Inventors: Kosuke Okahashi, Tokyo (JP); Yu Kataoka, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 281 days.

(21) Appl. No.: 18/390,112

(22) Filed: Dec. 20, 2023

(65) Prior Publication Data

US 2024/0255783 A1 Aug. 1, 2024

(30) Foreign Application Priority Data

Jan. 30, 2023 (JP) ................................. 2023-011942

(51) Int. Cl.
| | |
|---|---|
| *G02F 1/035* | (2006.01) |
| *G02B 6/12* | (2006.01) |
| *G02F 1/03* | (2006.01) |
| *G02F 1/21* | (2006.01) |

(52) U.S. Cl.
CPC .............. *G02F 1/035* (2013.01); *G02B 6/12* (2013.01); *G02F 1/0327* (2013.01); *G02F 1/212* (2021.01); *G02B 2006/12142* (2013.01)

(58) Field of Classification Search
CPC ........ G02F 1/0327; G02F 1/035; G02F 1/212; G02B 6/12; G02B 2006/12142
See application file for complete search history.

(56) References Cited

U.S. PATENT DOCUMENTS 10,989,980 B2 * 4/2021 Iwatsuka ............... G02F 1/2255
11,536,903 B1 * 12/2022 Letavic .................. G02B 6/124

FOREIGN PATENT DOCUMENTS

| EP | 3842858 A1 * | 6/2021 | ............. G02F 1/011 |
|---|---|---|---|
| JP | 2570822 B | 2/1990 | |
| JP | 2012-53487 A | 3/2012 | |
| JP | 2022-148652 A | 10/2022 | |

* cited by examiner

*Primary Examiner* — Daniel Petkovsek
(74) *Attorney, Agent, or Firm* — IPHORGAN LTD.

(57) ABSTRACT

An optical waveguide device includes an optical waveguide formed on a substrate, in which an optical modulator section that modulates a light wave propagating through the optical waveguide is formed in a part of the optical waveguide, in which a first dielectric layer covers the optical waveguide, and a second dielectric layer formed of a different material from the first dielectric layer is disposed on the first dielectric layer in a part of the optical waveguide excluding the optical modulator section.

7 Claims, 9 Drawing Sheets

FIG. 1
RELATED ART
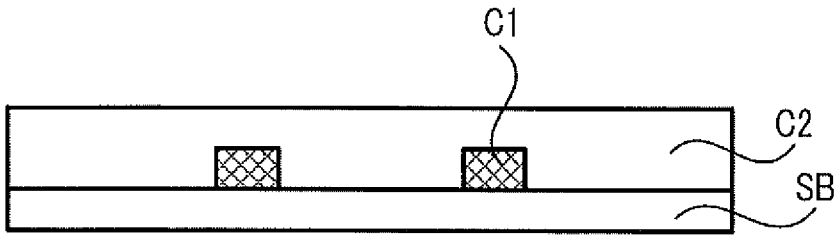
FIG. 2
RELATED ART
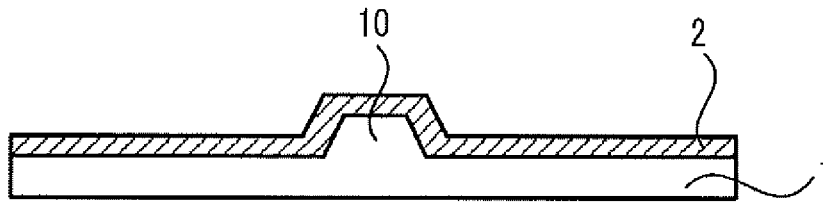
FIG. 3
RELATED ART

OPTICAL WAVEGUIDE DEVICE, AND OPTICAL MODULATION DEVICE AND OPTICAL TRANSMISSION APPARATUS USING SAME

CROSS-REFERENCE TO RELATED APPLICATIONS

This application claims the benefit of Japanese Patent Application No. 2023-011942 filed Jan. 30, 2023, the disclosure of which is herein incorporated by reference in its entirety.

BACKGROUND OF THE INVENTION

Field of the Invention

The present invention relates to an optical waveguide device, and an optical modulation device and an optical transmission apparatus using the same, and particularly to an optical waveguide device including an optical waveguide formed on a substrate, in which an optical modulator section that modulates a light wave propagating through the optical waveguide is formed in a part of the optical waveguide, and an optical modulation device and an optical transmission apparatus using the same.

Description of Related Art

In the field of optical measurement technology or in the field of optical communication technology, optical waveguide devices such as an optical modulator using a substrate on which an optical waveguide is formed have been widely used. In a general optical waveguide device, an optical waveguide is formed on a substrate of lithium niobate (LN) or the like having an electro-optic effect, and a control electrode that applies an electric field to the optical waveguide is formed on the substrate. In addition, there is an optical waveguide device in which a thin film layer of LN or the like is formed on a substrate of Si, sapphire, or the like and an optical waveguide is formed.

In addition, various scattering suppression layers are formed on the optical waveguide formed on the substrate in order to reduce a light scattering loss caused by degradation of a surface of the optical waveguide. In Japanese Patent No. 2570822, forming a core layer C1 on an upper surface of a substrate SB of $SiO_2$ or the like and forming a clad layer C2 on the entire surface to cover the core layer are disclosed, as illustrated in FIG. 1. The clad layer C2 has an effect of alleviating degradation of a surface of the core layer C1.

In Japanese Laid-open Patent Publication No. 2012-53487, forming a rib type optical waveguide 10 on a substrate 1 and disposing a buffer layer 2 using $SiO_2$ on the entire surface of the substrate 1 including the optical waveguide 10 are disclosed, as illustrated in FIG. 2. The buffer layer 2 has an effect of reducing the light scattering loss caused by degradation of an upper surface or a side surface of the optical waveguide 10.

In Japanese Laid-open Patent Publication No. 2022-148652, disposing a dielectric film 20 using resin such as a photoresist to cover the rib type optical waveguide 10 is disclosed, as illustrated in FIG. 3. Such a resin layer also has an effect of reducing the light scattering loss caused by degradation of a surface of the rib type optical waveguide. FIG. 3 illustrates an example in which electrodes EL are disposed to interpose the optical waveguide 10 between the electrodes EL.

Meanwhile, in recent years, high bandwidth-coherent driver modulators (HB-CDM) have drawn attention. The optical waveguide formed on the substrate has a width and a height of approximately 1 μm and uses a protruding optical waveguide (for example, a rib type waveguide, a ridge type waveguide, or a slot type waveguide) configured as a protruding portion extending in a band shape. Such a micro protruding waveguide has strong confinement of light, and the optical waveguide can be bent with a small curvature. Thus, it is possible to form a compact optical waveguide device.

In the micro-optical waveguide, the light scattering loss caused by degradation of the upper surface or the side surface of the optical waveguide poses a significant issue in forming the optical waveguide by processing the substrate via dry etching. In a case where the rib type optical waveguide is used as a core, a smaller refractive index of the clad results in better confinement of light. Thus, while air is originally better as a material to be disposed around the rib type optical waveguide, the clad layer ($SiO_2$ or resin) other than air is disposed in order to alleviate degradation of the side surface, as illustrated in FIGS. 1 to 3.

However, as illustrated in FIG. 2, in a case where the buffer layer 2 of $SiO_2$ is disposed on the entire surface of the substrate, internal stress from the buffer layer 2 covering the micro-optical waveguide (a height or a width is approximately 1 μm) damages the optical waveguide or causes the buffer layer to peel. Thus, characteristic deterioration such as an increase in a propagation loss of the optical waveguide device occurs.

Thus, using the resin material such as a permanent resist as illustrated in FIG. 3 is expected to decrease a Young's modulus and to alleviate stress applied to the optical waveguide 10 from the dielectric layer 20. However, an optical absorption loss caused by the resin material occurs, and in a case where the electrode EL is disposed near the optical waveguide as in FIG. 3, an optical absorption loss caused by the electrode also occurs. Furthermore, in a case where resin is disposed on a radio frequency electrode (EL), this also poses an issue of deterioration in high-frequency characteristics.

SUMMARY OF THE INVENTION

An object to be addressed by the present invention is to address the above issue and to provide an optical waveguide device that can suppress a light scattering loss caused by degradation of a surface of an optical waveguide and an optical absorption loss caused by an electrode or the like and alleviate stress caused by a dielectric layer covering the optical waveguide. Furthermore, an optical modulation device and an optical transmission apparatus using the optical waveguide device are provided.

In order to address the object, an optical waveguide device of the present invention, and an optical modulation device and an optical transmission apparatus using the same of the present invention have the following technical features.

(1) An optical waveguide device includes an optical waveguide formed on a substrate, in which an optical modulator section that modulates a light wave propagating through the optical waveguide is formed in a part of the optical waveguide, in which a first dielectric layer covers the optical waveguide, a second dielectric layer formed of a different material from the first dielectric layer is disposed on the first dielectric layer in a part of the optical waveguide excluding the optical modulator section.

(2) In the optical waveguide device according to (1), the first dielectric layer may be formed of an inorganic material having a lower refractive index than a refractive index of a material constituting the optical waveguide, and the second dielectric layer may be formed of an organic material having a lower refractive index than the refractive index of the material constituting the optical waveguide.

(3) In the optical waveguide device according to (1), a thickness of the first dielectric layer may be 1 μm or less, and a thickness of the second dielectric layer may be 2 μm or greater.

(4) In the optical waveguide device according to (1), a spot size converter may be formed in an end portion of the optical waveguide, and the first dielectric layer and the second dielectric layer may be used as a part of constituents of the spot size converter.

(5) In the optical waveguide device according to (1), the substrate may be a thin film layer formed on a surface of a reinforcing substrate.

(6) An optical modulation device includes the optical waveguide device according to any one of (1) to (5), a case accommodating the optical waveguide device, and an optical fiber through which a light wave is input into or output from the optical waveguide.

(7) In the optical modulation device according to (6), the optical waveguide device may include a modulation electrode for modulating a light wave propagating through the optical waveguide, and an electronic circuit that amplifies a modulation signal to be input into the modulation electrode may be provided inside the case.

(8) An optical transmission apparatus includes the optical modulation device according to (7), a light source that inputs a light wave into the optical modulation device, and an electronic circuit that outputs a modulation signal to the optical modulation device.

In the present invention, an optical waveguide device includes an optical waveguide formed on a substrate, in which an optical modulator section that modulates a light wave propagating through the optical waveguide is formed in a part of the optical waveguide, in which a first dielectric layer covers the optical waveguide, and a second dielectric layer formed of a different material from the first dielectric layer is disposed on the first dielectric layer in a part of the optical waveguide excluding the optical modulator section. Thus, by using two types of dielectric layers in combination with each other, an optical waveguide device that addresses various objects (a light scattering loss caused by degradation of a surface of an optical waveguide, an optical absorption loss caused by an electrode or the like, internal stress caused by a dielectric layer covering the optical waveguide, and the like) corresponding to a location, such as an optical modulator section or other optical waveguide parts, in which the dielectric layer is used can be provided.

Furthermore, the optical waveguide device having such advantageous characteristics can also be used to provide an optical modulation device and an optical transmission apparatus that achieve the same effect.

BRIEF DESCRIPTION OF THE DRAWINGS

FIG. 1 is a cross section view illustrating an example of an optical waveguide device disclosed in Japanese Patent No. 2570822.

FIG. 2 is a cross section view illustrating an example of an optical waveguide device disclosed in Japanese Laid-open Patent Publication No. 2012-53487.

FIG. 3 is a cross section view illustrating an example of an optical waveguide device disclosed in Japanese Laid-open Patent Publication No. 2022-148652.

DETAILED DESCRIPTION OF THE INVENTION

Figure 4:
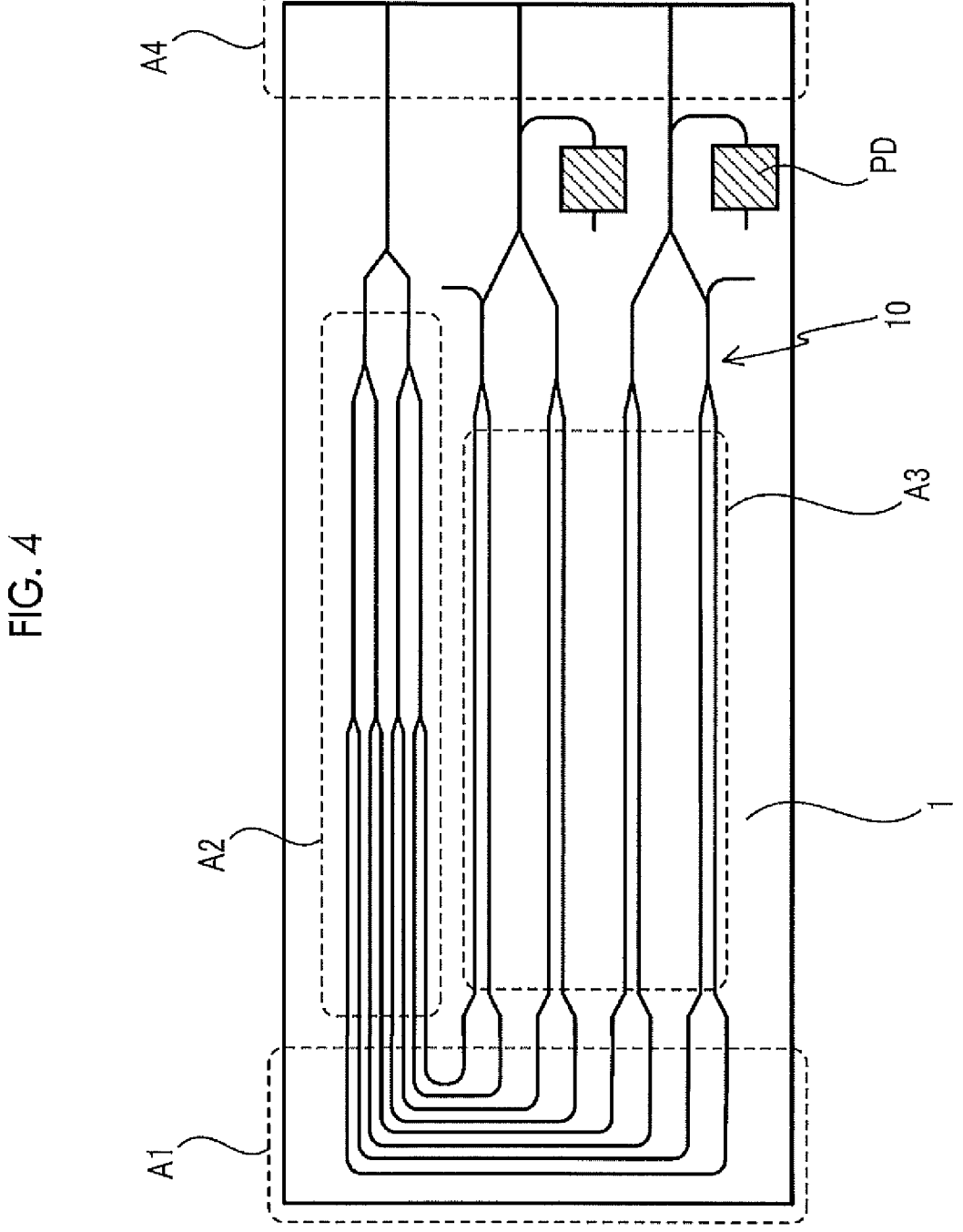
FIG. 4 is a plan view illustrating an example of an optical waveguide device of the present invention.

Hereinafter, an optical waveguide device of the present invention will be described in detail using preferred examples. FIG. 4 is a plan view illustrating an example of the optical waveguide device of the present invention, and FIGS. 5A and 5B are cross section views of a part illustrated in FIG. 4.

Figure 5A:
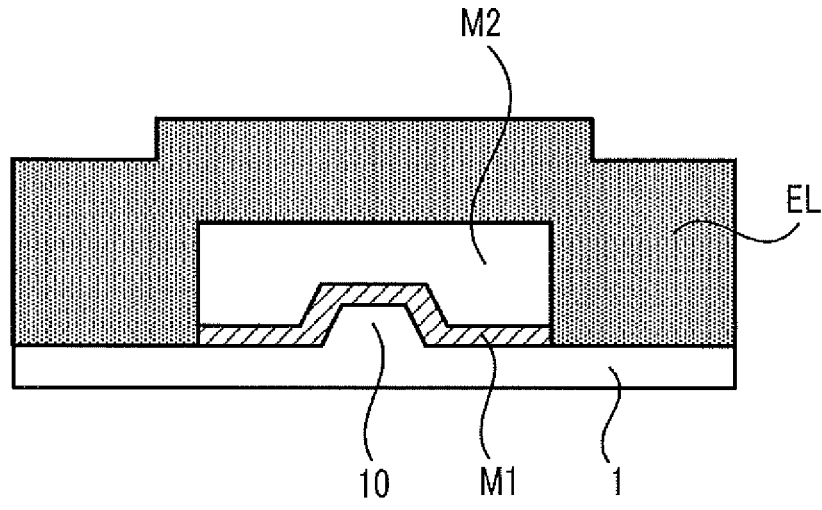
FIG. 5A is a cross section view illustrating a part of the optical waveguide device in FIG. 4.
Figure 5B:
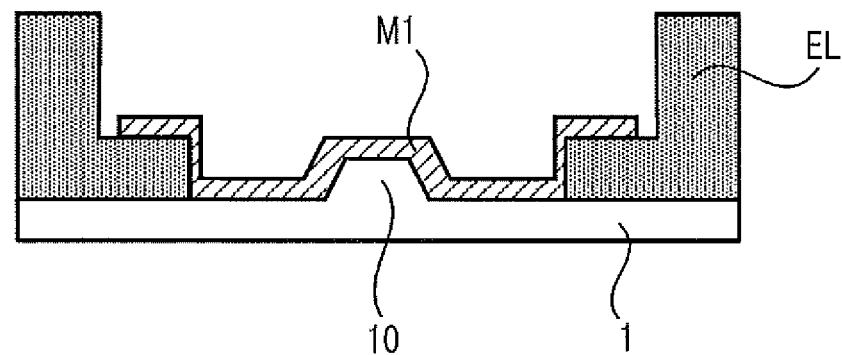
FIG. 5B is a cross section view illustrating a part of the optical waveguide device in FIG. 4.

The optical waveguide device of the present invention is an optical waveguide device including an optical waveguide 10 formed on a substrate 1, in which an optical modulator section (refer to a dotted line frame A3 in FIG. 4 and FIG. 5B) that modulates a light wave propagating through the optical waveguide is formed in a part of the optical waveguide, in which a first dielectric layer M1 covers the optical waveguide, and a second dielectric layer M2 formed of a different material from the first dielectric layer M1 is disposed on the first dielectric layer M1 in a part of the optical waveguide (for example, refer to a part of a dotted line frame A1 or A2 in FIG. 4 and FIG. 5A) excluding the optical modulator section. An electrode EL in FIG. 5A is an electrode that covers the optical waveguide or is disposed across the optical waveguide 10. The electrode may not be present depending on a location of the optical waveguide.

As the substrate 1 used in the optical waveguide device of the present invention, a substrate having an electro-optic effect can be used. Specifically, substrates of lithium niobate (LN), lithium tantalate (LT), lead lanthanum zirconate titanate (PLZT), and the like or base materials obtained by doping these substrate materials with MgO or the like can be used. In addition, these substrates can be polished into thin plates (thin film layers), or these materials can be formed into thin films using a sputtering method, a vapor deposition method, or a vapor-phase growth method such as a CVD method. Furthermore, semiconductor substrates and the like can be used.

As a method of forming the optical waveguide 10, a rib type waveguide obtained by etching the substrate 1 other than the optical waveguide or a protruding optical waveguide obtained by forming a part corresponding to the optical waveguide of the substrate as a protruding portion by, for example, forming grooves on both sides of the optical waveguide like a ridge type waveguide can be used. In addition, a slot type waveguide obtained by removing the entire part other than the optical waveguide using a method such as etching can be used. Furthermore, a refractive index can be further increased by diffusing Ti or the like on a surface of the substrate using a thermal diffusion method, a proton exchange method, or the like in accordance with the protruding optical waveguide. The protruding optical waveguide is a micro protruding optical waveguide having a width and a height of approximately 1 μm as a size in order to increase confinement of light.

A thickness of the substrate (thin plate) 1 on which optical waveguide 10 is formed is set to 10 μm or less, more preferably 5 μm or less, and still more preferably 1 μm or less in order to achieve velocity matching between a microwave of a modulation signal and the light wave. In addition, a height of the protruding optical waveguide is set to 4 μm or less, more preferably 3 μm or less, and still more preferably 1 μm or less or 0.4 μm or less.

In the substrate 1 on which the optical waveguide is formed, a reinforcing substrate (refer to reference sign SB in FIGS. 9 and 10A to 10C) is joined to a lower side of the substrate 1 in order to increase mechanical strength. The substrate 1 and the reinforcing substrate are adhesively fixed via direct joining or through an adhesive layer of resin or the like. In a case of direct joining, an intermediate layer of metal oxide, metal, or the like may be provided. The reinforcing substrate to be directly joined preferably has, but is not limited to, a lower refractive index than a refractive index of the optical waveguide or than a refractive index of the substrate on which the optical waveguide is formed. In addition, a substrate including a material, for example, an oxide layer of crystal or glass, having a similar coefficient of thermal expansion to the substrate 1 is preferably used as the reinforcing substrate. Furthermore, the same LN substrate as the substrate 1, or a composite substrate obtained by forming a silicon oxide layer on a silicon substrate and a composite substrate obtained by forming a silicon oxide layer on a LN substrate, which are abbreviated to SOI and LNOI, can also be used.

The substrate 1 can also be configured by using a substrate of silicon, sapphire, or the like as the reinforcing substrate and laminating a surface of the reinforcing substrate with a material such as LN used in the optical waveguide using the vapor-phase growth method to form the thin film layer. In addition, the LN substrate or the like can be bonded to the reinforcing substrate, and the LN substrate can be polished into a thin plate.

A modulation electrode for applying an electric field to the optical waveguide is formed in the optical modulator section formed in the part of the optical waveguide. Electrodes formed on the substrate include, in addition to the modulation electrode, a DC bias electrode used for adjusting a phase of the light wave propagating through the optical waveguide. In the present invention, particularly, a high-frequency signal is applied to the modulation electrode. Thus, which material is to be selected for the dielectric layer covering the optical waveguide is important considering high-frequency characteristics of the optical waveguide device.

A control electrode including the modulation electrode or the DC bias electrode is formed by forming a base electrode using the sputtering method, the vapor deposition method, or the like and then forming the base electrode into a thick electrode using a plating method.

In description of the present invention, an example of a so-called X plate in which the electrodes EL are disposed to interpose the optical waveguide between the electrodes EL as in FIG. 5B will be mainly described. However, the substrate (optical waveguide) used in the present invention is not limited to such an X plate and can, of course, be applied to a Z plate in which the electrode is disposed on an upper side of the optical waveguide.

The material, disposition, and the like of the dielectric layer covering the optical waveguide are features of the optical waveguide device of the present invention. Hereinafter, these features will be described in detail.

FIG. 4 is a plan view of the optical waveguide device, and the optical waveguide 10 is formed on the substrate 1. The optical waveguide device of the present invention is not limited to the shape of the optical waveguide in FIG. 4 and can employ various patterns. Here, the dielectric layer and the control electrode are not illustrated in order to make it easy to see the pattern of the optical waveguide. In FIG. 4, one input waveguide branches into four Mach-Zehnder-type waveguides and finally leads to two output waveguides. An end portion of the input waveguide and an end portion of the output waveguide are disposed on the same side surface of the substrate 1. The optical waveguide as a whole has a bent structure.

A dotted line frame A1 indicates a bent part of the optical waveguide, and a dotted line frame A2 indicates a part branching into a plurality of optical waveguides. A dotted line frame A3 is a part in which the optical modulator section in which the modulation electrode is disposed is formed. In a case of providing the DC bias electrode, the DC bias electrode can be provided in any of A1 to A3. In addition, wiring on the substrate 1 is required in order to apply the modulation signal or a DC bias voltage to the control electrode. For example, an electrode for wiring may be disposed in A1 or A2 (for example, refer to FIG. 5A).

A dotted line frame A4 is a part in which the end portions of the input waveguide and the output waveguide are disposed. In a case where a micro-optical waveguide having a width and a height of approximately 1 μm is used as the optical waveguide, a spot size converter (SSC) is disposed in an end portion of the optical waveguide, and a mode diameter of the propagating light wave is configured to be converted from approximately 1 μm to 3 μm or greater or in reverse.

Reference sign PD is a light-receiving element for monitoring the light waves output from the Mach-Zehnder-type waveguides, and the light-receiving elements are disposed on the substrate 1.

FIG. 5B is a diagram illustrating a part of a cross section taken in the optical modulator section A3. The first dielectric layer M1 is disposed to cover the optical waveguide 10.

The first dielectric layer M1 functions as a light scattering suppression layer for suppressing light scattering caused by degradation of a surface of the optical waveguide.

As a material constituting the first dielectric layer, a material that has a refractive index lower than a refractive index of the optical waveguide or of the substrate constituting the optical waveguide and that has little optical absorption in a communication waveguide range is used. Particularly, considering that the first dielectric layer is also disposed in the optical modulator section, an inorganic material is preferable.

As an example of the inorganic dielectric material, for example, $SiO_2$, SiN, $Al_2O_3$, MgF, $La_2O_3$, ZnO, MgO, $CaF_2$, and $Y_2O_3$ can be used.

It is required to set a thickness of the first dielectric layer M1 to a film thickness that does not cause concentration of deposition stress on the optical waveguide.

Specifically, a thickness of 100 nm or greater may be sufficient for alleviating degradation of the surface of the optical waveguide. In addition, for the velocity matching between the modulation signal and the light wave, while the velocity matching depends on a shape of the modulation electrode, for example, balance between shapes of electrodes in a first stage and a second stage, a thickness of 100 nm may be sufficient. More preferably, the thickness is 200 nm or greater. Furthermore, 1 μm or less is desirable as a constraint on the deposition stress or on a process.

Figure 6:
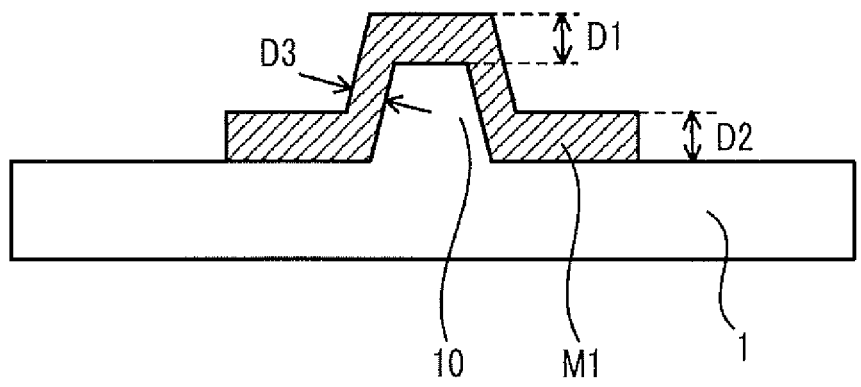
FIG. 6 is a diagram for describing a film thickness of a first dielectric layer covering an optical waveguide.

As illustrated in FIG. 6, for the thickness of the first dielectric layer M1 covering the protruding optical waveguide 10, a thickness D3 of the first dielectric layer positioned on a side surface of the protruding optical waveguide is preferably configured to be smaller than a thickness D1 of the first dielectric layer positioned on an upper surface of the protruding optical waveguide 10. For example, the thickness D3 is set to approximately 0.5 times or 0.8 times D1. Accordingly, confinement of light in a horizontal direction can be strengthened, and an electrode clearance can be further narrowed. Consequently, an increase in a drive voltage Vπ can be suppressed.

A thickness D2 of the first dielectric layer M1 disposed on an upper surface of the substrate 1 other than the protruding optical waveguide is basically the same as D1.

Figure 7A:
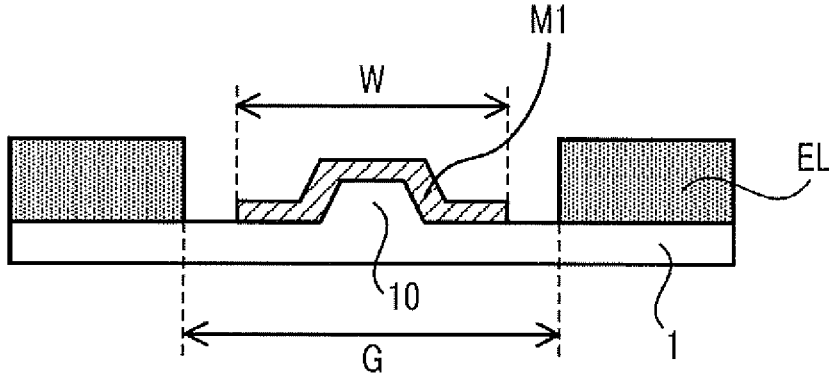
FIG. 7A is a diagram for describing an application example of the cross section view illustrated in FIG. 5B.
Figure 7B:
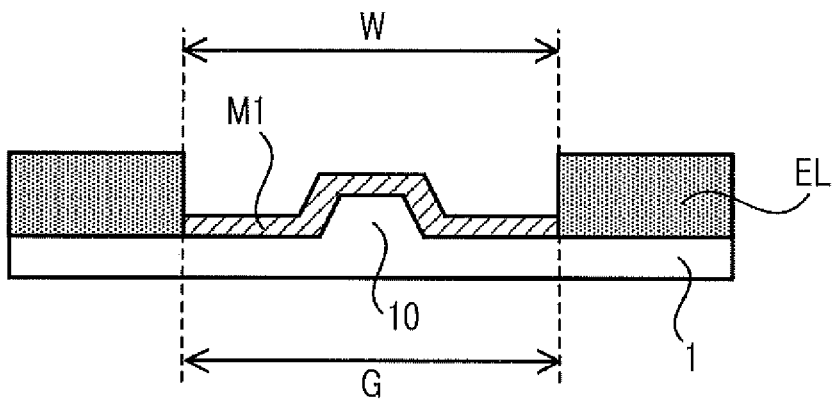
FIG. 7B is a diagram for describing an application example of the cross section view illustrated in FIG. 5B.
Figure 7C:
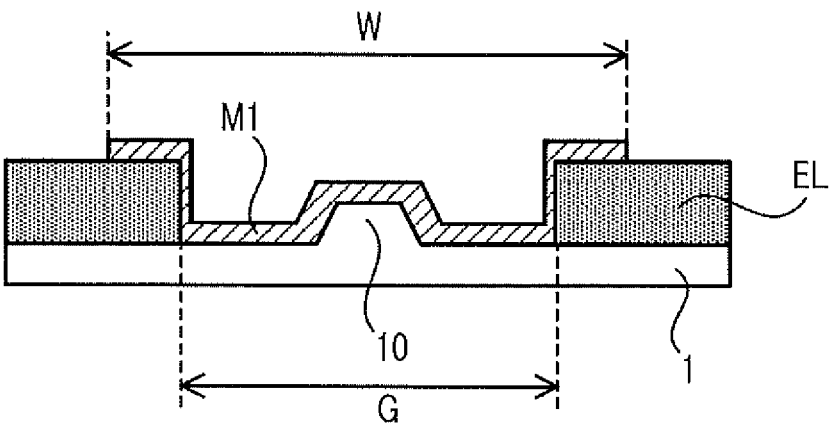
FIG. 7C is a diagram for describing an application example of the cross section view illustrated in FIG. 5B.

FIGS. 7A to 7C are diagrams for describing an example in which a width W of the first dielectric layer in FIG. 5B is changed.

The width W as the light scattering suppression layer, which is the function of the first dielectric layer, may be a width covering the side surface of the optical waveguide from a viewpoint of light scattering suppression. As illustrated in FIG. 7A, in a case where the width W of the first dielectric layer is a width that is 1.5 times a mode field diameter (MFD) of the optical waveguide 10, light scattering in parts protruding to a slab portion on both sides of the optical waveguide 10 of the substrate 1 can also be effectively suppressed.

Considering process stability and manufacturing positional accuracy, the width W may be the same as an electrode clearance G as in FIG. 7B. More preferably, the width W that is twice or more than the electrode clearance G is desirable. In addition, setting the width W not to be below one times the electrode clearance G also achieves an effect of not deteriorating Vπ, compared to a case of W<G as in FIG. 7A.

The first dielectric layer can be disposed not only in the optical modulator section but also on the entire surface of the substrate on which the optical waveguide is formed. In addition, the first dielectric layer can be partially disposed using, for example, a method of performing deposition on the entire surface and then forming a desired pattern by removing other than a required part via wet/dry etching or a lift-off method of disposing a resist having a desired pattern on other than a part in which the first dielectric layer (light scattering suppression layer) is required and then performing deposition on the entire surface and removing the resist.

Regarding the first dielectric layer, only the first dielectric layer can be configured to be disposed on the optical waveguide in a part, other than the optical modulator section, in which an optical absorption member such as an electrode is not disposed.

Next, in a case where a wiring electrode is disposed across the optical waveguide as in the regions A1 and A2 in FIG. 4, it is required to suppress optical absorption caused by the wiring electrode by disposing not only the first dielectric layer M1 but also the second dielectric layer M2 on the first dielectric layer M1 as illustrated in FIG. 5A. This is because a function of suppressing optical absorption is not sufficient with the film thickness of the first dielectric layer M1 since the first dielectric layer M1 is formed as thin as possible to alleviate stress.

As a material to be used in the second dielectric layer, a material having a lower refractive index than the refractive index of the substrate on which the optical waveguide is formed is preferable, and a material having lower deposition stress than the first dielectric layer is preferable.

Specifically, the second dielectric layer is preferably formed of an organic material. For example, resin such as a resist that has a low Young's modulus and that is easily patterned is desirable. For example, materials such as polyamide-based resin, melamine-based resin, phenol-based resin, amino-based resin, and epoxy-based resin can be used. For example, a Young's modulus of the second dielectric layer is preferably 15 GPa or less and is preferably less than a Young's modulus of the first dielectric layer.

A thickness of the second dielectric layer (optical absorption suppression layer) may be 2 μm or greater in order to suppress optical absorption and can be adjusted to any film thickness within a range of, for example, 2 to 10 μm.

The second dielectric layer is formed by applying resin or the like via spin coating, performing patterning via a general lithography process, and leaving only a required portion.

Figure 8A:
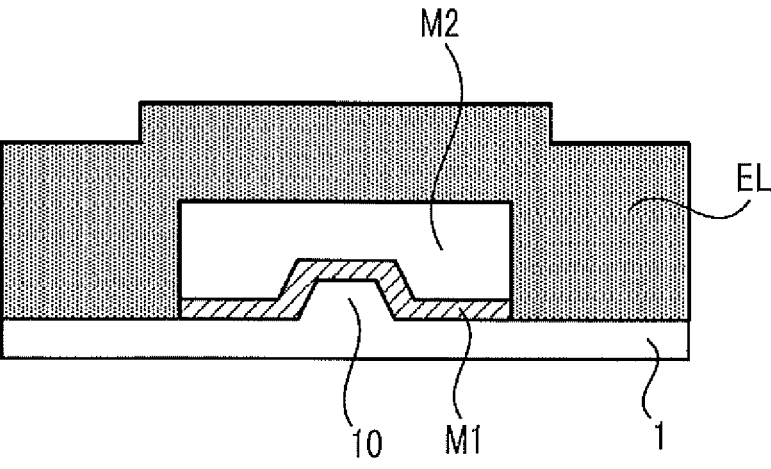
FIG. 8A is a diagram for describing an application example of the cross section view illustrated in FIG. 5A.

Widths of the first dielectric layer and the second dielectric layer can be selected based on a close contact between laminated materials. For example, in a case where a close contact among the first dielectric layer M1, the second dielectric layer M2, and the substrate 1 (LN) is good, the first dielectric layer M1 and the second dielectric layer M2 are set to have approximately the same width as illustrated in FIG. 8A.

Figure 8B:
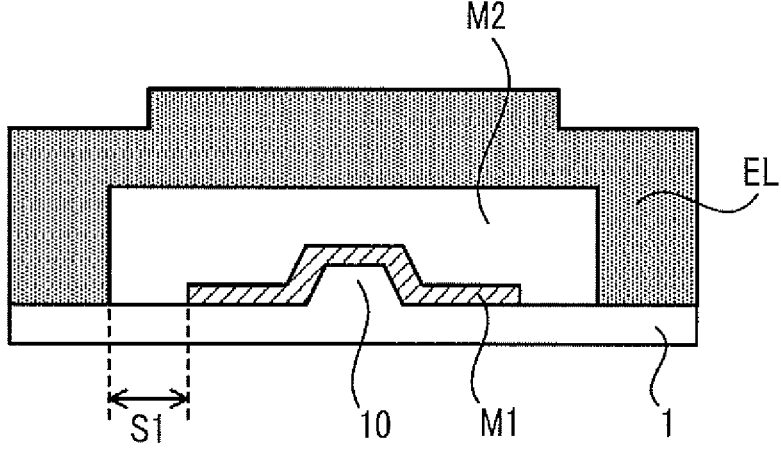
FIG. 8B is a diagram for describing an application example of the cross section view illustrated in FIG. 5A.

In addition, in a case where a close contact between the first dielectric layer M1 and the second dielectric layer M2 is bad and a close contact between the substrate 1 and the second dielectric layer M2 is good, the second dielectric layer M2 is formed to have a width protruding by a width S1 from the first dielectric layer M1 as illustrated in FIG. 8B.

Figure 8C:
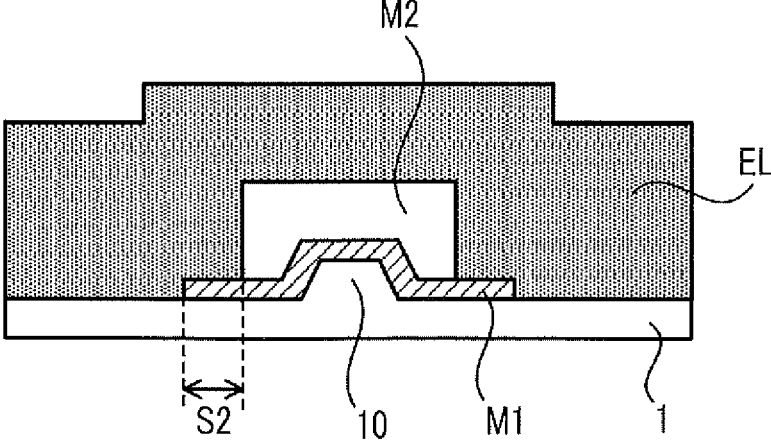
FIG. 8C is a diagram for describing an application example of the cross section view illustrated in FIG. 5A.

Furthermore, in a case where a close contact between the first dielectric layer M1 and the second dielectric layer M2 is good and a close contact between the substrate 1 and the second dielectric layer M2 is bad, the second dielectric layer M2 is set to be narrower by a width S2 than the first dielectric layer M1 as illustrated in FIG. 8C.

Considering the process stability and the manufacturing positional accuracy, a total quantity of the width S1 or S2 (an overlap width; twice as much as S1 or S2) protruding to the left and the right in the drawings are preferably set to +10% or greater than a total width of the first or second dielectric layer.

Next, the spot size converter illustrated in FIGS. 9 to 11A to 11C will be described. While the spot size converter provided in the output waveguide will be mainly described below, the input waveguide can also be configured to have the same shape.

Figure 9:
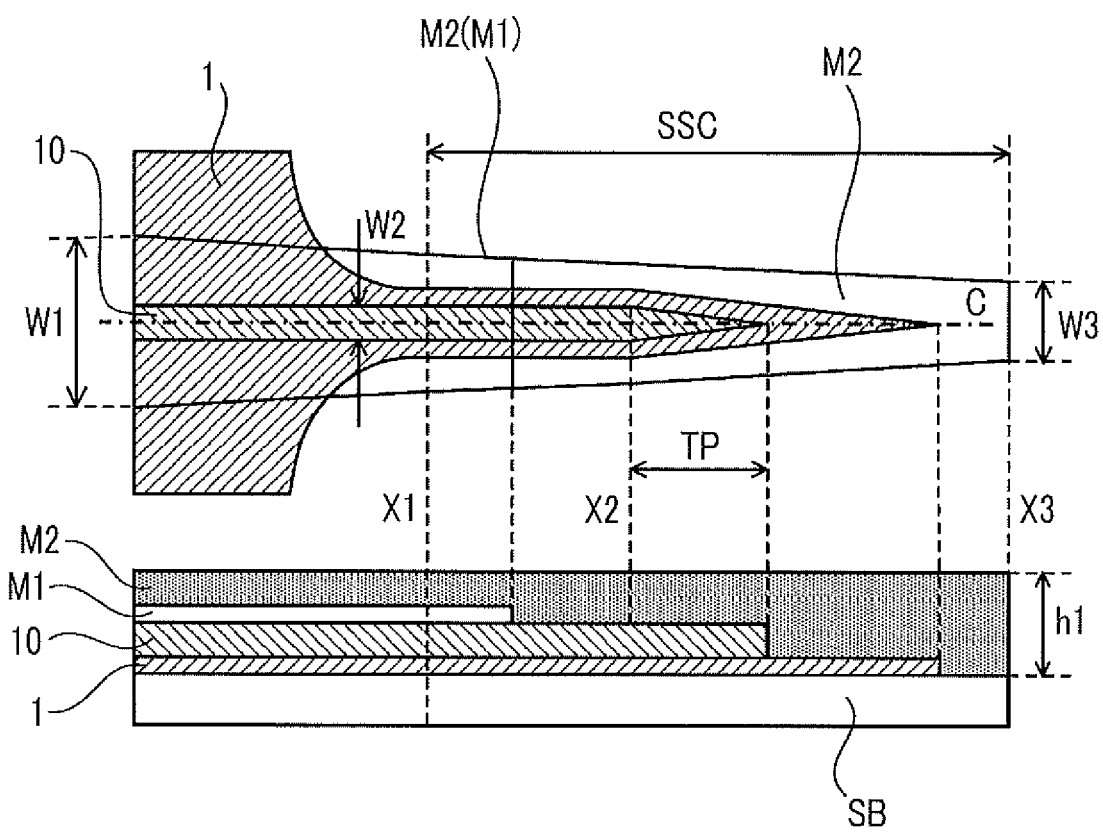
FIG. 9 is a diagram illustrating an example of a spot size converter used in the optical waveguide device of the present invention.

The upper half of FIG. 9 is a plan view illustrating an example of the spot size converter (SSC).

The lower half of FIG. 9 illustrates a cross section view taken along dot-dashed line C in the plan view.

In the spot size converter (a region of SSC within a bidirectional arrow), the rib type waveguide 10 has a tapered shape in which a width of the optical waveguide is gradually narrowed in a region TP. A width of the slab portion constituting the substrate 1 of the rib type waveguide also preferably has a tapered shape toward a tip end, as necessary.

While the first dielectric layer M1 is disposed to enter into a part of the spot size converter SSC, the first dielectric layer M1 has a structure that finally ends in the middle of the spot size converter SSC. As the rib type waveguide 10 is gradually tapered, the light wave is transferred to the second dielectric layer M2.

Figure 10A:
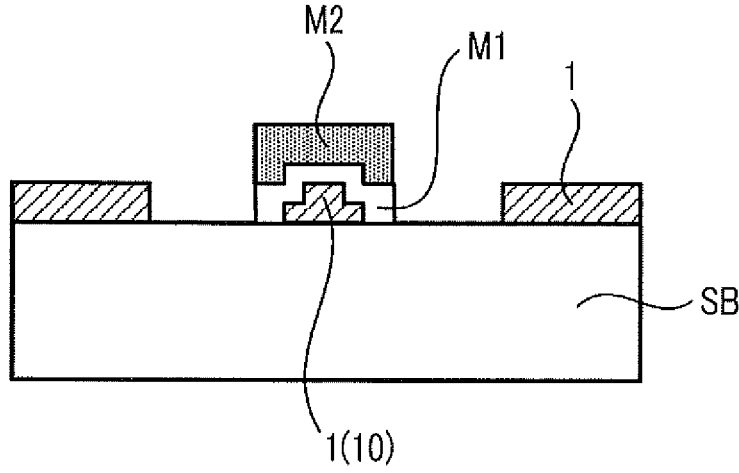
FIG. 10A is a diagram illustrating a cross section taken at a different location in FIG. 9.
Figure 10B:
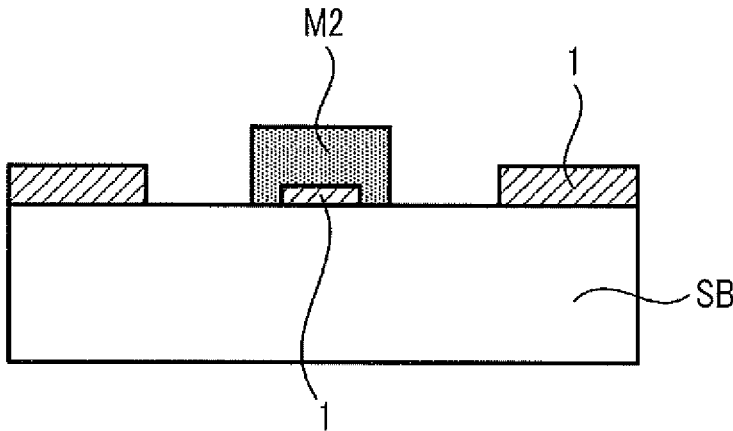
FIG. 10B is a diagram illustrating a cross section taken at a different location in FIG. 9.
Figure 10C:
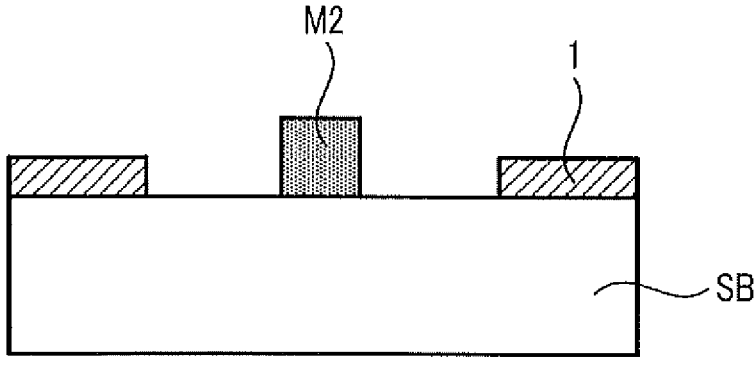
FIG. 10C is a diagram illustrating a cross section taken at a different location in FIG. 9.
Figure 11A:
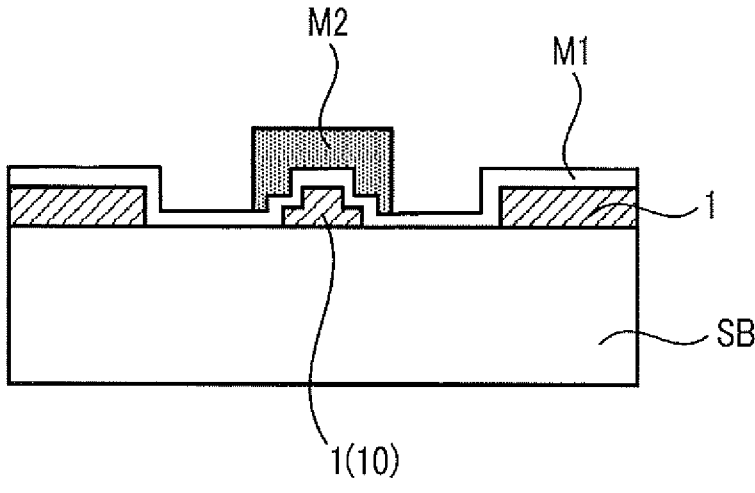
FIG. 11A is a diagram (another example) illustrating a cross section taken at a different location in FIG. 9.
Figure 11B:
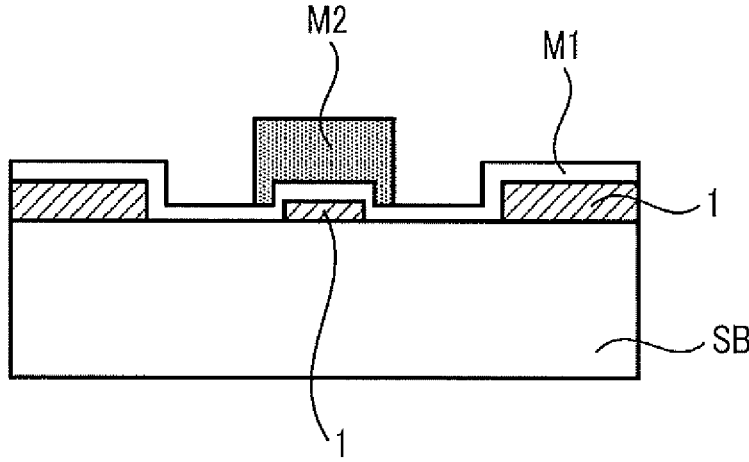
FIG. 11B is a diagram (another example) illustrating a cross section taken at a different location in FIG. 9.
Figure 11C:
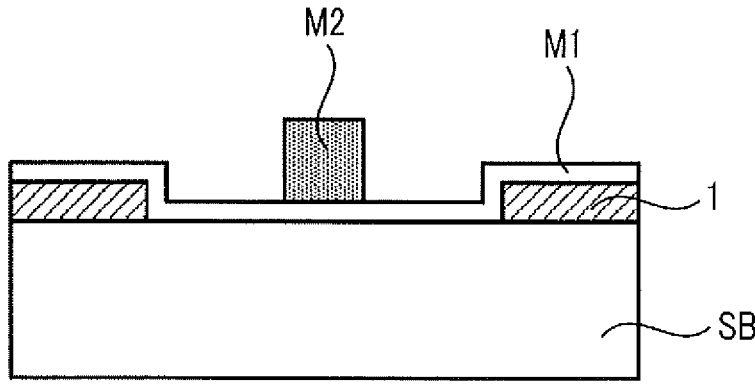
FIG. 11C is a diagram (another example) illustrating a cross section taken at a different location in FIG. 9.

A cross section view taken at a position X1 in FIG. 9 is illustrated in FIG. 10A, a cross section view taken at a position X2 is illustrated in FIG. 10B, and furthermore, a cross section view taken at a position X3 is illustrated in FIG. 10C.

Regarding a width of the second dielectric layer, a width W1 before entering the spot size converter is 5 μm or greater, but a width W2 in an end portion of the spot size converter is set to be less than 5 μm, for example, approximately 2 μm to 4 μm. The width of the second dielectric layer (optical absorption suppression layer) is narrowed in a tapered shape inside the spot size converter, and the width is the narrowest at a position of a tip end of the spot size converter.

In a case where the thickness of the first dielectric layer (light scattering suppression layer) is 400 nm or greater, the light scattering suppression layer causes a conversion loss during spot size conversion. Thus, the light scattering suppression layer preferably ends before a tapered portion of the rib type waveguide 10 starts.

In addition, as illustrated in FIG. 10A, the first dielectric layer (light scattering suppression layer) M1 is disposed only below the second dielectric layer M2.

In a case where the thickness of the first dielectric layer (light scattering suppression layer) is 200 nm or less, whether or not the light scattering suppression layer is present does not affect the conversion loss. Thus, the light scattering suppression layer may be disposed up to an end of the spot size converter. The cross section views at the positions X1 to X3 in FIG. 9 in this case correspond to cross section views in FIGS. 11A to 11C.

Of course, as in FIGS. 10A to 10C, the first dielectric layer (light scattering suppression layer) M1 may end before the tapered portion of the rib type waveguide 10 starts.

As described above, by using the first dielectric layer M1 and the second dielectric layer M2 as a part of constituents of the spot size converter, a manufacturing process can be simplified, and a thin film constituting the optical waveguide part and the spot size converter can be continuously formed. Thus, an optical insertion loss can also be suppressed.

Next, examples of applying the optical waveguide device of the present invention to an optical modulation device and to an optical transmission apparatus will be described. While an example of HB-CDM will be used in the following description, the present invention is not limited to the example and can also be applied to an optical phase modulator, an optical modulator having a polarization combining function, an optical waveguide device in which a larger or smaller number of Mach-Zehnder type optical waveguides are integrated, a device joined to an optical waveguide device including other materials such as silicon, a device used as a sensor, and the like.

Figure 12:
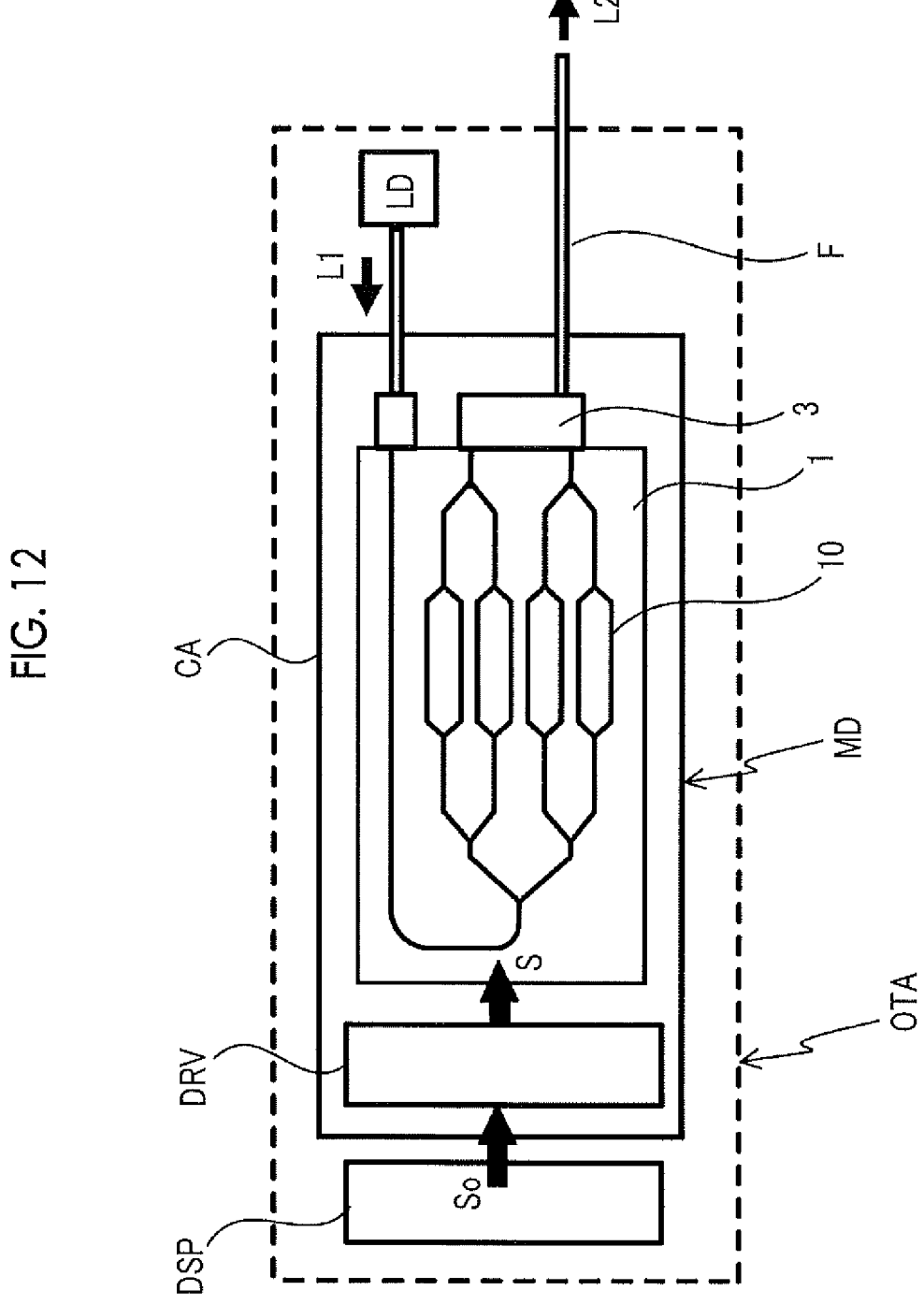
FIG. 12 is a diagram illustrating an example of an optical transmission apparatus of the present invention.

As illustrated in FIG. 12, the optical waveguide device includes the optical waveguide 10 formed on the substrate 1, and the control electrode (not illustrated) such as the modulation electrode that modulates the light wave propagating through the optical waveguide 10. The optical waveguide device is accommodated inside a case CA. Furthermore, an optical modulation device MD can be configured by providing an optical fiber (F) through which the light wave is input into the optical waveguide or output from the optical waveguide. In FIG. 12, the optical fiber F is optically coupled to the optical waveguide 10 inside the optical waveguide device using an optical block including an optical lens, a lens barrel, a polarization combining unit 3, and the like. The present invention is not limited to the optical fiber F in FIG. 12. The optical fiber may be introduced into the case through a through-hole that penetrates through a side wall of the case. The optical fiber may be directly joined to an optical component or to the substrate, or the optical fiber having a lens function in an end portion of the optical fiber may be optically coupled to the optical waveguide inside the optical waveguide device. In addition, a reinforcing member (not illustrated) can be disposed to overlap along an end surface of the substrate 1 in order to stably join the optical fiber or the optical block.

An optical transmission apparatus OTA can be configured by connecting, to the optical modulation device MD, an electronic circuit (digital signal processor DSP) that outputs a modulation signal So causing the optical modulation device MD to perform a modulation operation. In order to obtain a modulation signal S to be applied to the optical waveguide device, it is required to amplify the modulation signal So output from the digital signal processor DSP. Thus, in FIG. 12, the modulation signal is amplified using a driver circuit DRV. The driver circuit DRV and the digital signal processor DSP can be disposed outside the case CA or can be disposed inside the case CA. Particularly, disposing the driver circuit DRV inside the case can further reduce a propagation loss of the modulation signal from the driver circuit.

While input light L1 of the optical modulation device MD may be supplied from an outside of the optical transmission apparatus OTA, a semiconductor laser (LD) can also be used as a light source as illustrated in FIG. 12. Output light L2 modulated by the optical modulation device MD is output to the outside through the optical fiber F.

As described above, according to the present invention, it is possible to provide an optical waveguide device that can suppress a light scattering loss caused by degradation of a surface of an optical waveguide and an optical absorption loss caused by an electrode or the like and alleviate stress caused by a dielectric layer covering the optical waveguide.

Furthermore, it is possible to provide an optical modulation device and an optical transmission apparatus using the optical waveguide device.

What is claimed is:

1. An optical waveguide device including a protruding optical waveguide formed on a substrate with a thickness of 1 μm or less, in which an optical modulator section that modulates a light wave propagating through the protruding optical waveguide is formed in a part of the protruding optical waveguide, wherein a first dielectric layer covers all of the protruding optical waveguide, a second dielectric layer formed of a different material from the first dielectric layer is disposed on the first dielectric layer and is not formed anywhere in the optical modulator section, a thickness of the first dielectric layer is 1 μm or less, a thickness of the second dielectric layer is 2 μm or greater, and a Young's modulus of the second dielectric layer is less than a Young's modulus of the first dielectric layer.

2. The optical waveguide device according to claim 1, wherein the first dielectric layer is formed of an inorganic material having a lower refractive index than a refractive index of a material constituting the protruding waveguide, and the second dielectric layer is formed of an organic material having a lower refractive index than the refractive index of the material constituting the protruding optical waveguide.

3. The optical waveguide device according to claim 1, wherein a spot size converter is formed in an end portion of the protruding optical waveguide, and the first dielectric layer and the second dielectric layer are used as a part of constituents of the spot size converter.

4. The optical waveguide device according to claim 1, wherein the substrate is a thin film layer formed on a surface of a reinforcing substrate.

5. An optical modulation device comprising:

the optical waveguide device according to claim 1; a case accommodating the optical waveguide device; and an optical fiber through which a light wave is input into the protruding optical waveguide or output from the protruding optical waveguide.

6. The optical modulation device according to claim 5, wherein the optical waveguide device includes a modulation electrode for modulating a light wave propagating through the protruding optical waveguide, and an electronic circuit that amplifies a modulation signal to be input into the modulation electrode is provided inside the case.

7. An optical transmission apparatus comprising:

the optical modulation device according to claim 6;

a light source that inputs a light wave into the optical modulation device; and an electronic circuit that outputs a modulation signal to the optical modulation device.

* * * * *